Figure 1:
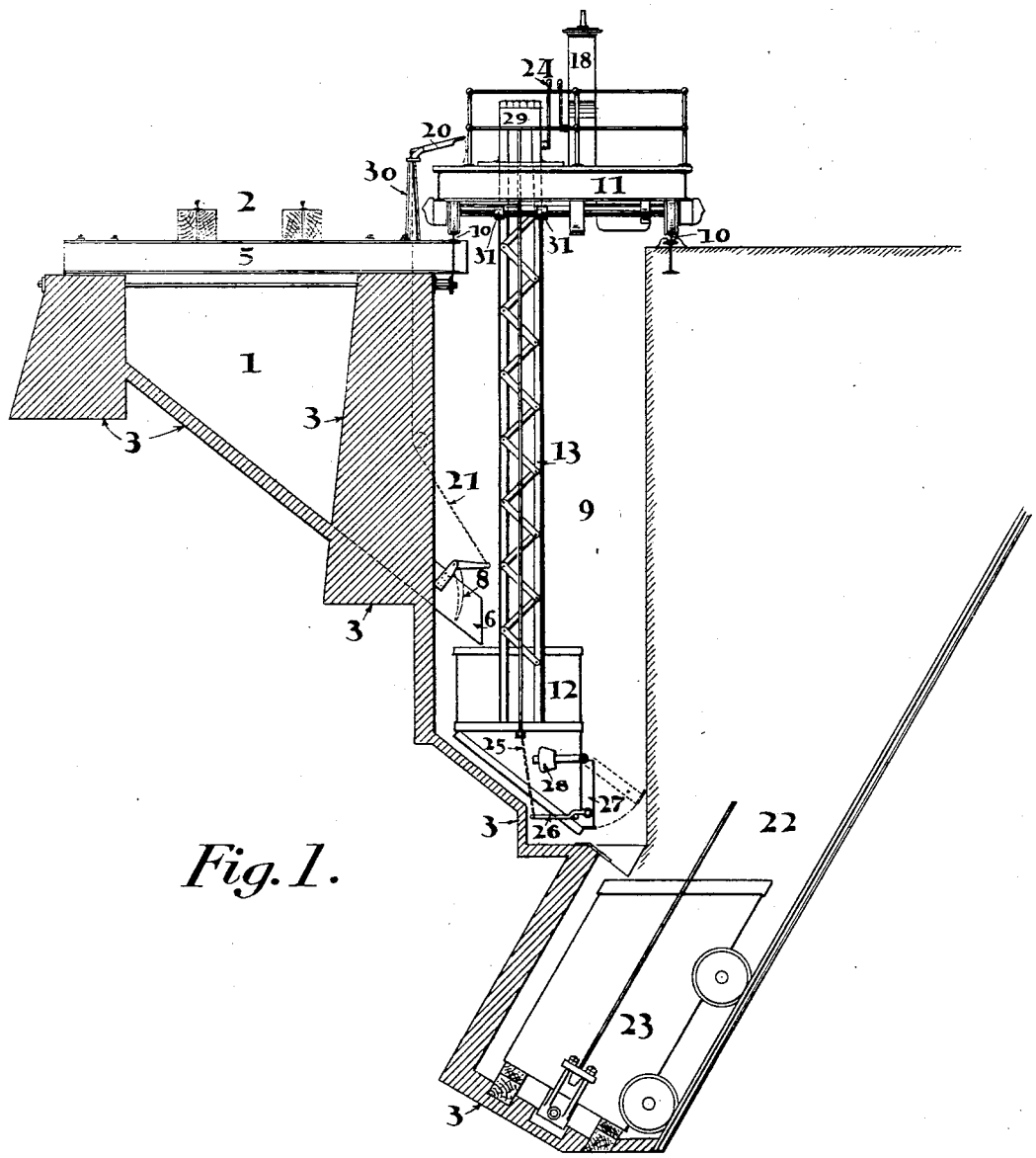

(No Model.) 2 Sheets—Sheet 1.

M. M. SUPPES.
STOCK DISTRIBUTING AND COLLECTING APPARATUS.

No. 590,467. Patented Sept. 21, 1897.

WITNESSES:
M. E. Sharpe.
H. C. Stiff.

INVENTOR
M. M. Suppes
BY
Richard Lyn
ATTORNEY.

(No Model.) 2 Sheets—Sheet 2.

M. M. SUPPES.
STOCK DISTRIBUTING AND COLLECTING APPARATUS.

No. 590,467. Patented Sept. 21, 1897.

WITNESSES:
M. E. Sharpe
H. C. Stiff

INVENTOR
M. M. Suppes
BY
Richard Eyn
ATTORNEY.

UNITED STATES PATENT OFFICE.

MAXIMILIAN M. SUPPES, OF ELYRIA, OHIO.

STOCK DISTRIBUTING AND COLLECTING APPARATUS.

SPECIFICATION forming part of Letters Patent No. 590,467, dated September 21, 1897.

Application filed April 29, 1897. Serial No. 634,451. (No model.)

*To all whom it may concern:*

Be it known that I, MAXIMILIAN M. SUPPES, of Elyria, Lorain county, Ohio, have invented certain new and useful Improvements in Stock Distributing and Collecting Apparatus, of which the following is a specification.

My invention is particularly adapted for use with blast-furnaces, and I will describe it with special reference thereto; but I am not limited to the use of my improvements in connection with blast-furnaces, for they will also find advantageous uses in connection with other kindred manufacture.

The object of my invention is to provide a stock-yard of such a character and such improved means for collecting the stock therefrom and conveying it to the proper destination that the stock will be handled in a highly-efficient manner and at the lowest possible expense. To attain this general object, I provide an improved arrangement and construction of the stock-bins and a novel and useful stock-carrier adapted to weigh the stock as it is collected and deliver it directly to a car or other desired destination.

In the charging of blast-furnaces many materials are necessarily used, comprising limestone, coke, different grades of ores, and often roll-scale, cinder, and other special iron-containing materials. Large stocks of these materials must be kept on hand, aggregating in some large plants hundreds of thousands of tons.

The simplest charge that is dumped into the furnace must consist of a mixture comprising a portion of coke, a portion of limestone, and a plurality of portions of separate ores. Often ten or fifteen ingredients are contained in each charge. Each ingredient of this mixture must be accurately weighed. To accomplish this mixing of stock, the usual practice has been to convey each ingredient in a separate barrow to a pair of fixed scales and after weighing the barrow and contents and adjusting the quantity of the latter carrying each barrow to the top of the furnace to dump it upon the top thereof. This has required a large number of men, for some of the ingredients are necessarily a considerable distance from the furnace-hoist. The difficulty in providing labor-saving devices has largely arisen from the necessity already mentioned of weighing each ingredient separately, for to bring each ingredient to a fixed weighing mechanism requires a large number of stock-carriers, which must be capable of readily turning out of the road, so that they may pass each other. This difficulty I have surmounted by the provision of my novel stock-carrier, which carries with it a vessel supported by a suitable weighing mechanism and other apparatus hereinafter set forth. By the use of this stock-carrier I am enabled to collect a large part or the whole, as desired, of each charge in a single vessel, and I am enabled to provide a system of tracks and bins so combined that the amount of labor can be cut to the minimum and the distance to be traversed also reduced. On account of being able to provide tracks the stock-carrier may also be propelled by some form of power other than that of manual labor.

Various detailed improvements and their incumbent advantages will be set forth hereinafter.

Figure 3:
Figure 2:
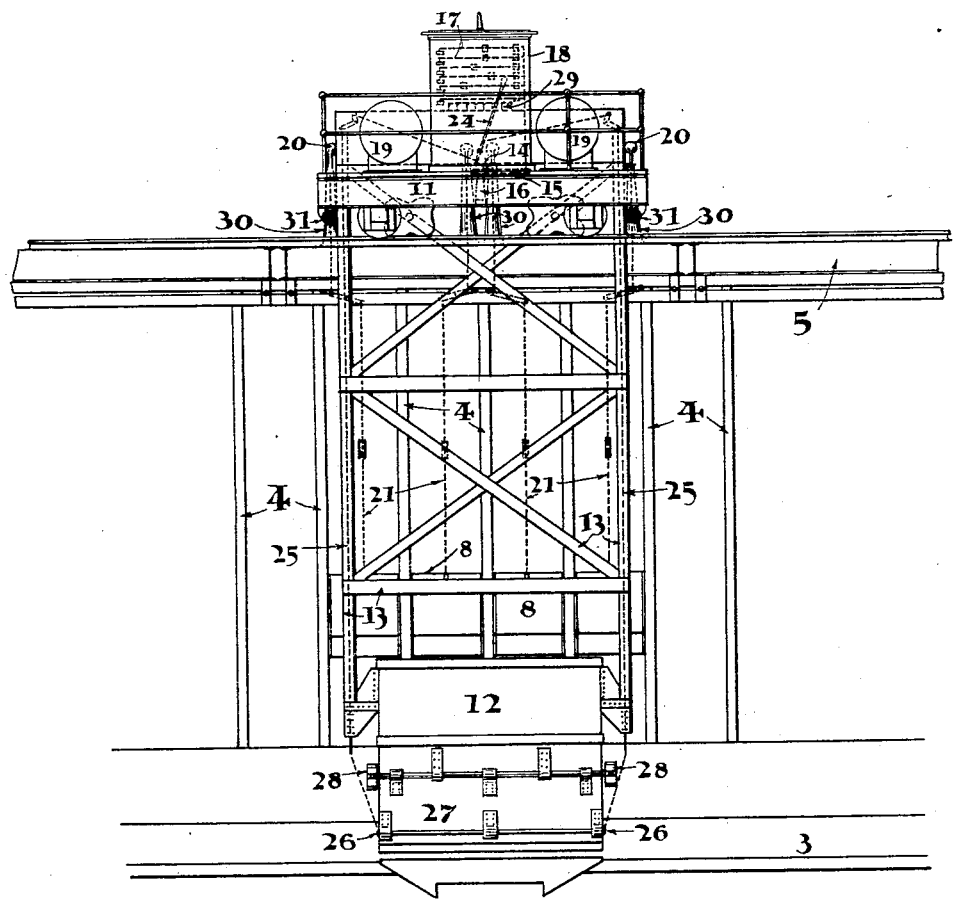

Referring to the drawings, Figure 1 is a side elevation, largely in section, showing one of my improved stock-bins, the stock-carrier, and a car adapted to receive the contents of said carrier and transfer it to the top of a blast-furnace. Fig. 2 is a front elevation of the stock-carrier, showing also portions of the stock-bins and tracks. Fig. 3 is a plan view of the bins.

1 1 are the bins into which the stock is dropped from the cars standing on the tracks 2 2, which I prefer to have on the ground-level, but which may be elevated where conditions make underground bins undesirable.

3 represents concrete or similar material forming the foundation of the bins, &c., and 4 4 are vertical metal beams, and 5 5 are I-beams supporting the track structures.

Each bin has a plurality of discharge-chutes 6 6 at its lower end through which the stock may be discharged. By this arrangement no delays are caused by scaffolding, for if stock cannot be obtained from one chute the operator passes to the next, and the passage of the stock therethrough will break the scaffold. The mouth of each discharge-chute is closed by a door 8.

The discharge-chutes all extend into the continuous pit 9 between the rails of the track 10. Upon the track 10 runs the electrically-propelled car 11, carrying the bucket 12, the top of which in its travel passes beneath the ends of the discharge-chutes 6 6. This bucket is suspended by the framework 13, which carries a knife-edge 16 on the car-platform. The lever 15 is connected to the scale-beams 17 17 of the scale 18. The car 11 is moved from bin to bin by means of motors controlled by the rheostats 19 19.

When the operator is filling his bucket, he stops opposite the desired bin and presses the foot-lever 20, which raises the door 8 of the discharge-chute 6 by means of the chain 21. As soon as his scale-beam indicates that he has taken the requisite weight of the particular kind of stock in this bin he releases the foot-lever and passes to a bin containing some other kind of stock and sets the second of his scale-beams 17 17 therefor.

Having filled the bucket 12 with the desired charge, the car is moved opposite the skip-pit 22, where a car 23, traveling on a suitable track, is in readiness to receive the contents of several buckets, as 12, and transfer them to the top of the blast-furnace. By throwing the lever 24 the chains 25 25 raise the trip-arms 26 26, and the weight of the stock pressing against the door 27 opens it and the stock falls into the car 23. The weight 28 coacts with the pressure of the stock to open the door and keep it open until the bucket is emptied. The door closes automatically as soon as the bucket is emptied, and, the lever 24 having been thrown back, the trip-arm falls into its normal position.

29 is the seat for the operator.

I prefer to vertically pivot the foot-lever 20 on the post 30. By so doing there is no danger of harm being done to the operator by carelessness on his part as he passes the levers.

31 31 are guide-rollers for the frame 13.

It will be seen at once that my invention provides cheap and highly labor-saving stock distributing and collecting apparatus.

It is evident that those skilled in the art might make many modifications in the details of my invention—such, for example, as securing the bucket above the car instead of below—and therefore I wish to be understood as not limiting myself to the exact details shown and described.

My invention is broader than the specific embodiment thereof which I have disclosed, and I do not, therefore, limit myself to said specific embodiment.

Having thus described my invention, what I claim, and desire to protect by Letters Patent, is—

1. The combination of a plurality of stationary bins having discharge-chutes, a stock-carrier movable along a suitable track contiguous to said bins, a weighing mechanism carried by said stock-carrier, a vessel supported by said weighing mechanism and passing, in its travel, beneath said chutes.

2. The combination with a plurality of bins, each of which has a plurality of discharge-chutes with normally-closed doors, of means for opening said doors and a car carrying a vessel which, in its travel, passes beneath said doors.

3. A stock-carrier comprising the combination of a truck and means for propelling the same, framework extending downward therefrom and supported by a suitable weighing mechanism, and a stock-collecting vessel carried by said framework.

4. In a stock-carrier, in combination, a suitable truck, means for propelling the same, a framework extending below the truck a vessel having a discharging-door, mechanism for normally locking the door with connections extending to the car-platform affording means for releasing said mechanism.

5. A stock-carrier comprising a truck having a platform adapted to carry an operator, a weighing mechanism upon said platform and a frame extending downward therefrom and supporting a stock-collecting vessel, and a lever upon said platform having connections to the door of said vessel for opening the same.

6. The combination of a plurality of stock-bins having discharging-chutes and doors normally closing the same, and a stock-carrier adapted to travel beside said bins, with operating-levers for opening said doors located contiguous to the line of travel of said stock-carrier.

7. A stock-bin and a vertically-pivoted lever for opening the door thereof, in combination with a movable stock-carrier having a platform which, in its travel, passes beneath the end of said lever.

In testimony whereof I have affixed my signature in presence of two witnesses.

MAXIMILIAN M. SUPPES.

Witnesses:
G. M. FERGUSON,
FRED W. WATERMAN.